United States Patent
Chao et al.

(10) Patent No.: US 9,285,227 B1
(45) Date of Patent: Mar. 15, 2016

(54) CREATING ROUTING PATHS IN MAPS

(71) Applicant: QUALCOMM Incorporated, San Diego, CA (US)

(72) Inventors: Hui Chao, San Jose, CA (US); Jiajian Chen, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/608,498

(22) Filed: Jan. 29, 2015

(51) Int. Cl.
*G01C 21/00* (2006.01)
*G01C 21/20* (2006.01)

(52) U.S. Cl.
CPC .................................... *G01C 21/206* (2013.01)

(58) Field of Classification Search
None
See application file for complete search history.

(56) References Cited

U.S. PATENT DOCUMENTS

| | | | |
|---|---|---|---|
| 9,146,299 B2 * | 9/2015 | Chao | G01S 5/0294 |
| 2007/0184850 A1 | 8/2007 | Hupp et al. | |
| 2010/0318291 A1 * | 12/2010 | Gluck | G01C 21/367 |
| | | | 701/532 |
| 2011/0246148 A1 | 10/2011 | Gupta et al. | |
| 2012/0016872 A1 | 1/2012 | Khorashadi et al. | |
| 2012/0059720 A1 * | 3/2012 | Musabji | G01C 21/3638 |
| | | | 705/14.58 |
| 2013/0102334 A1 | 4/2013 | Khorashadi et al. | |
| 2013/0236105 A1 | 9/2013 | Chao et al. | |
| 2013/0236106 A1 | 9/2013 | Chao et al. | |
| 2013/0238234 A1 | 9/2013 | Chao et al. | |
| 2014/0155090 A1 | 6/2014 | Khorashadi et al. | |
| 2014/0236476 A1 * | 8/2014 | Khorashadi | G01C 21/206 |
| | | | 701/445 |
| 2014/0274138 A1 | 9/2014 | Chao et al. | |

FOREIGN PATENT DOCUMENTS

WO    WO-2011144968 A1    11/2011

OTHER PUBLICATIONS

Gonzalez R-C., et al., "Digital Image Processing Using MATLAB", Book excerpt, 2nd ed, 2009, pp. 356-359.
Lecture notes, entitled, "Lecture 5. Morphological Image Processing", author unknown, date of original publication unknown, downloaded on Jun. 26, 2014 at http://www-inst.eecs.berkeley.edu/~ee225b/fa12/lectures/morphology-gonzalez-woods.ppt (107 pages).
Purohit A., et al., "SugarTrail: Indoor Navigation in Retail Environments without Surveys and Maps," Tenth IEEE Conference on Sensing, Communication, and Networking (SECON 2013), Jun. 2013, pp. 300-308.

* cited by examiner

*Primary Examiner* — Adam Alharbi
(74) *Attorney, Agent, or Firm* — Berkeley Law & Technology Group, LLP

(57) ABSTRACT

A digital map having a routing path is created. Points in at least a majority of a linear length of the path may be constrained so that they are disposed substantially equidistant between structural features that are bounding navigable spaces in a structure. The creating of the path may include selecting a connected component corresponding to some or all of the navigable spaces. A morphological process may be performed on the connected component to create the path.

14 Claims, 10 Drawing Sheets

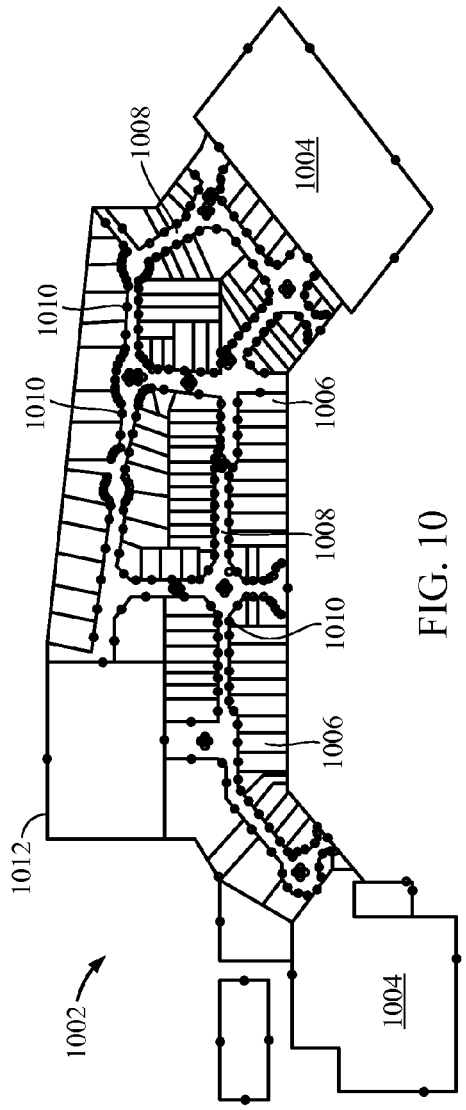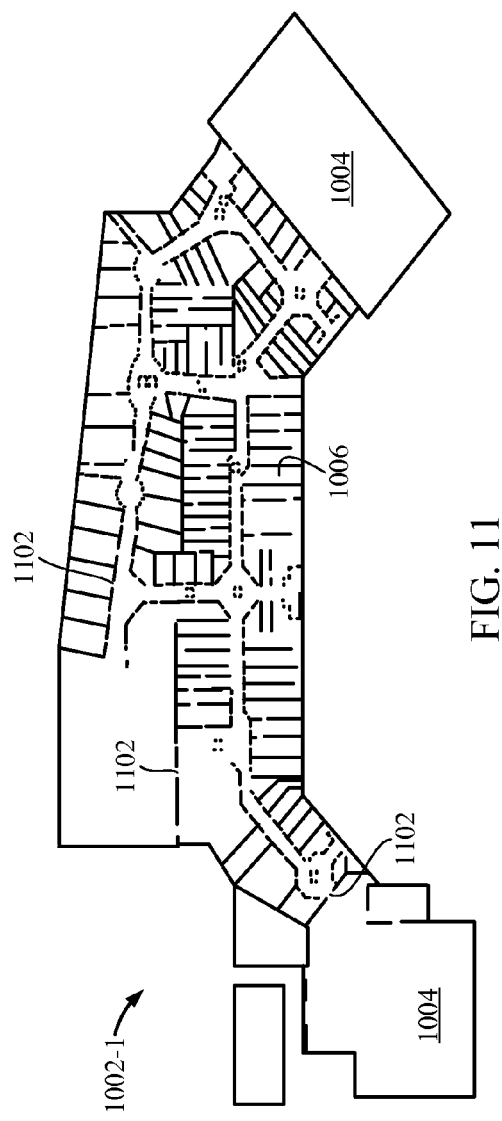

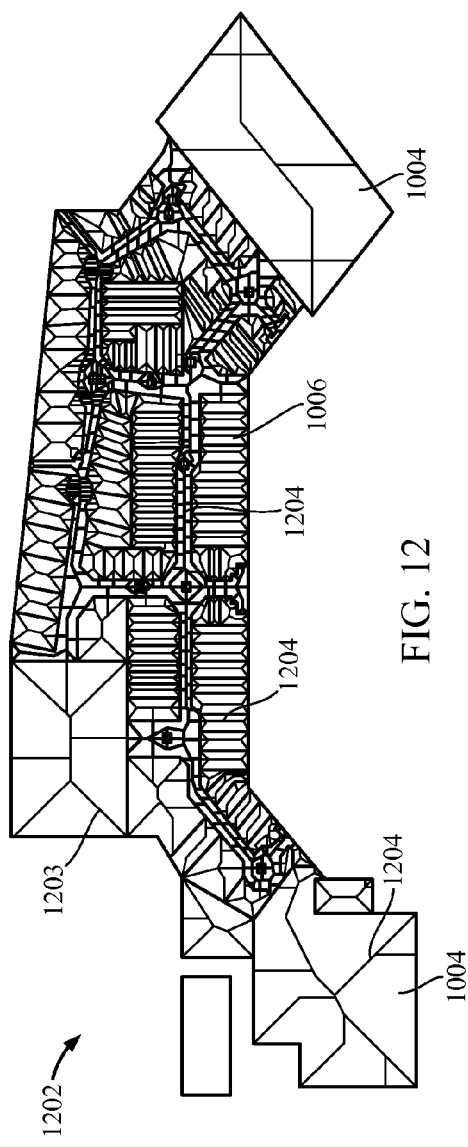
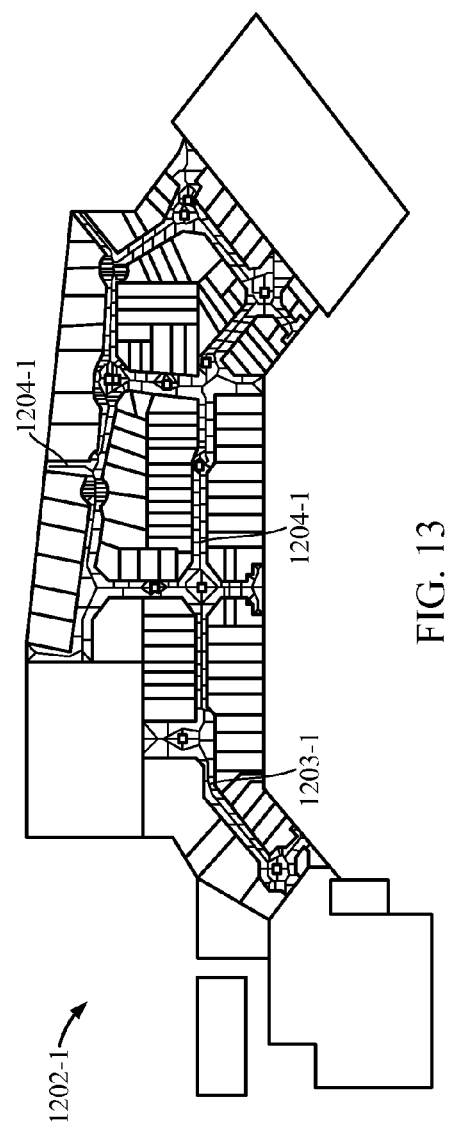
FIG. 12
FIG. 13

CREATING ROUTING PATHS IN MAPS

FIELD

Embodiments described herein are generally directed to the creation of routing paths in maps for positioning and navigation.

INFORMATION

The Global Positioning System (GPS) represents one type of Global Navigation Satellite System (GNSS), which along with other types of satellite positioning systems (SPS) provide or support signal-based position location capabilities (e.g., navigation functions) in mobile devices. However, since some satellite signals may not be reliably received or acquired by a mobile device within an indoor environment or other mixed indoor/outdoor environments, different techniques may be employed to enable position location services.

For example, mobile devices may attempt to obtain a position fix by measuring ranges to three or more terrestrial transmitters (e.g., wireless access points, beacons, cell towers, etc.) which are positioned at known locations. Such ranges may be measured, for example, by obtaining a MAC ID address from signals received from such transmitters and obtaining range measurements to the transmitters by measuring one or more characteristics of signals received from such transmitters such as, for example, signal strength, a round trip delay time, etc.

These and other position location and navigation techniques can be of further benefit to a user if presented with certain mapped features. For example, mapped features may relate to or otherwise identify certain physical objects, characteristics, or points of interest within a building or complex, etc. Thus, in certain instances an indoor navigation system can provide a digital electronic map to a mobile device upon entering a particular indoor area. Such a map may show indoor features such as doors, hallways, entry ways, walls, etc. and points of interest such as bathrooms, pay phones, room names, stores, etc. Such a digital electronic map may be stored at a server to be accessible by a mobile device through selection of a URL, for example. By obtaining and displaying such a map, a mobile device may overlay a current location of the mobile device (and user) over the displayed map to provide the user with additional location context.

SUMMARY

Broadly speaking, certain embodiments of the claimed subject matter relate to the obtaining of a digital map including a plurality of navigable spaces in an indoor area. The plurality of navigable spaces is bounded by a plurality of structural features. Using a processor, a path having a linear length and disposed in at least a portion of the plurality of the navigable spaces is created. The creating of the path includes constraining points in at least a majority of the linear length to be disposed substantially equidistant between at least a portion of the plurality of the structural features.

In an aspect of these certain embodiments, the digital map is in a bitmap format, and the creating of the path further comprises selecting a connected component. The connected component corresponds to at least a portion of the plurality of the navigable spaces. The path is based, at least in part, on the connected component.

In an alternative embodiment, a device comprises one or more processors to obtain a digital map including a plurality of navigable spaces in an indoor area. The plurality of navigable spaces is bounded by a plurality of structural features. The processors are further to create a path having a linear length and disposed in at least a portion of the plurality of the navigable spaces. The creating of the path includes constraining points in at least a majority of the linear length to be disposed substantially equidistant between at least a portion of the plurality of the structural features.

In an aspect of the foregoing alternative embodiment, the digital map is in a bitmap format, and the one or more processors are further to create the path by selecting a connected component. The connected component corresponds to at least a portion of the plurality of the navigable spaces. The path is based, at least in part, on the connected component.

In yet another alternative embodiment, a non-transitory, computer-readable, storage medium comprises machine-readable instructions stored thereon. The instructions are executable by a special purpose computing apparatus to obtain a digital map including a plurality of navigable spaces in an indoor area. The plurality of navigable spaces is bounded by a plurality of structural features. The instructions are further executable by the computing apparatus to create a path having a linear length and disposed in at least a portion of the plurality of the navigable spaces. The creating of the path includes constraining points in at least a majority of the linear length to be disposed substantially equidistant between at least a portion of the plurality of the structural features.

In an aspect of the foregoing alternative embodiment, the digital map is in a bitmap format, and the instructions are further executable by the computing apparatus to create the path by selecting a connected component. The connected component corresponds to at least a portion of the plurality of the navigable spaces. The path is based, at least in part, on the connected component.

There are additional aspects to claimed subject matter. It should therefore be understood that the preceding is merely a brief summary of some embodiments and aspects of the claimed subject matter. Additional embodiments and aspects are referenced below. It should further be understood that numerous changes to the disclosed embodiments can be made without departing from the spirit or scope of the claimed subject matter. The preceding summary therefore is not meant to limit the scope of the claimed subject matter. Rather, the scope of the claimed subject matter is to be determined by appended claims and their equivalents.

BRIEF DESCRIPTION OF THE DRAWINGS

These and/or other aspects and advantages of the present claimed subject matter will become apparent and more readily appreciated from the following description of certain embodiments, taken in conjunction with the accompanying drawings of which:

FIG. 10 is a representation of a digital map for use in generating a routing map in accordance with an example implementation;

FIG. 11 is a representation of a digital map that can be generated based upon certain processing of the map of FIG. 10 in accordance with an example implementation;

FIG. 12 is a representation of a map including a path that can be generated based upon certain processing of the map of FIG. 11 in accordance with an example implementation;

FIG. 13 is a representation of another map including a path that can be generated based upon certain processing of the map of FIG. 12 in accordance with an example implementation;

DETAILED DESCRIPTION

Figure 1:
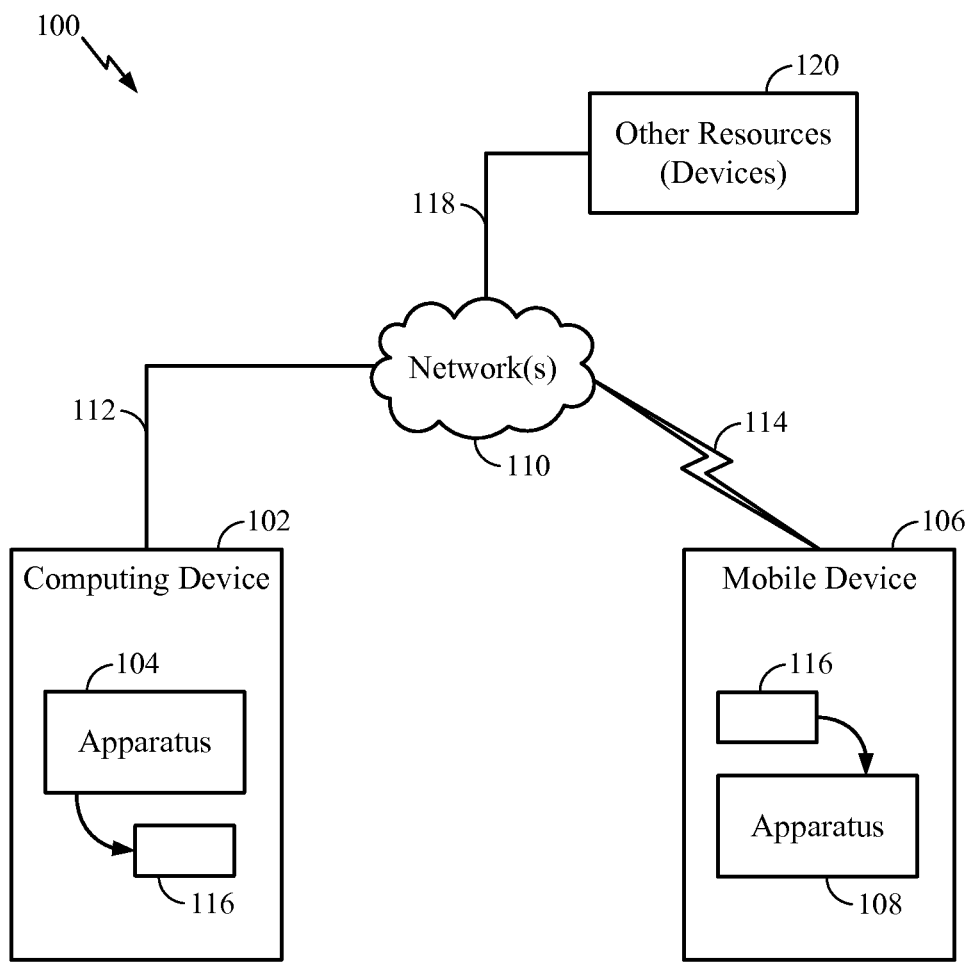
FIG. 1 is a schematic block diagram illustrating a computing and communication environment in which a routing map may be generated, transmitted, stored, or otherwise processed, in accordance with an example implementation.

The following description is of the best mode presently contemplated for carrying out claimed subject matter. Moreover in the following description, details are set forth by way of example to enable a person of ordinary skill in the art to practice claimed subject matter without undue experimentation. Reference will be made in detail to embodiments of claimed subject matter, examples of which are illustrated in the accompanying drawings, wherein like reference numerals refer to like elements throughout. It is understood that other embodiments may be used and structural and operational changes may be made without departing from the scope of claimed subject matter.

As previously mentioned satellite signals for use in navigation may not be reliably received or acquired in an indoor environment. Thus different techniques may be employed to enable navigation services. For example, mobile devices can typically obtain a position fix by measuring ranges to three or more terrestrial wireless access points which are positioned at known locations. Such ranges may be measured, for example, by obtaining a MAC ID address from signals received from such access points and measuring one or more characteristics of signals received from such access points such as, for example, signal strength, round trip delay, just to name a few examples.

In some implementations, an indoor navigation system may provide a digital electronic map to mobile stations as they enter a particular indoor area. Such a map may show indoor features such as doors, hallways, entry ways, walls, etc., and points of interest such as bathrooms, pay phones, room names, stores, etc. This map also may be stored at a server to be accessible by a mobile device through selection of a URL, for example. By obtaining and displaying such a map, a mobile device may overlay a current location of the mobile device (and user) over the displayed map to provide the user with additional context.

A digital map of an indoor space may be derived from a CAD drawing, for example. Here, such a CAD drawing may show rooms and hallways formed by walls, doorways, etc. Once the CAD drawing is transformed (if necessary) to a particular format usable as a digital map, the digital map may be electronically stored and accessed by mobile devices as discussed above. In one particular implementation, a grid of points is projected over an area covered by a map of an indoor area such as a floor of an office building, shopping mall, school building, etc. Neighboring grid points may then be selectively connected by edges subject to features in the map to indicate possible direct transitions between locations of the neighboring points without obstruction (e.g., walls). Here, the connected grid points form "nodes" in a routing graph for use in modeling the movement of a mobile device in the indoor area.

In particular implementations, a location of a mobile device may be modeled as being placed at points along edges connecting neighboring nodes in the routing graph described above. Likewise, transitions from an initial position to a subsequent position may be modeled to occur along edges of the routing graph. In addition, a likelihood model may further characterize possible transitions of a mobile device from an initial position to a subsequent over a time period. In a particular example, a particle filtering model may establish a likelihood that a mobile device is at a particular subsequent location and has a velocity and heading that is conditioned on an initial location, velocity and heading.

To provide sufficient granularity in a routing graph, grid points may be projected over an indoor area densely so that the graph can be sufficiently granular to support particular applications.

Many routing graphs have segments connecting grid points in an indoor area which show possible routing paths through navigable areas connecting rooms, hallways, etc. In some implementations a resulting routing graph connecting rooms (e.g., through a hallway) may not traverse the center of open areas or hallways that are disposed between the rooms. As pointed out above, grid points used for forming a routing graph may be placed at a uniform spacing when the points are projected over a map area and without regard to their relationship to structural features. Accordingly this placement of grid points relative to structural features such as walls can be arbitrarily aligned. The edges formed from such grid points therefore may not be centered between structural features bounding an open space (e.g., not centered between walls bounding a hallway). This may distort navigation functions that use the routing graph (e.g., a particle filter used for positioning operations).

However in a particular alternative implementation, a digital map defining or including a plurality of navigable spaces in an indoor area may be obtained. Navigable spaces may be bounded by structural features. A route or path within the indoor area is created. The path has a linear length and is disposed in navigable spaces. Creation of the path may include constraining points in at least a majority of the linear length of the path so that they are disposed substantially equidistant between the structural features bounding the navigable spaces.

In certain implementations, a computing and communication environment 100 is shown in FIG. 1 in which an electronic digital map may be generated, transmitted, stored, or otherwise processed, in accordance with an implementation. Example environment 100 comprises a computing device 102 having an apparatus 104 for use in generating all or part of a digital map 116 having routes or paths. As described in greater detail below, apparatus 104, for example, may obtain a diagram (e.g., one or more electronic files relating to a floor plan, map, CAD drawing, etc.) for a structure that includes an indoor area with structural features and navigable spaces that may be navigated in some manner by a user of a mobile device 106. Apparatus 104, for example, may create a routing path within the indoor area. Creation of the path may include the constraining of points in at least a majority of a linear length of the path so that they are disposed substantially equidistant (as observed by a user looking at the map) between the structural features bounding the navigable spaces in which the path is disposed. Apparatus 104, for example, may select a connected component corresponding to some or all of navigable spaces and perform a morphological process on the connected component to create the path in the map.

As shown, computing device 102 may be connected to one or more wired and/or wireless network(s) 110 via a communication link 112. Mobile device 106 may, for example, be coupled to network(s) 110 via a wireless communication link 114. As such, the digital map 116 may be transmitted or otherwise provided by computing device 102 to mobile device 106. Mobile device 106 may, for example, comprise an apparatus 108 which may generate, obtain, store, transmit, and/or otherwise process all or part of digital map 116. Network(s) 110 may, for example, be further connected to one or more other resources (devices) 120, e.g., via a communication link 118. In certain example implementations, computing device 102 and/or mobile device 106 may obtain all or part of an electronic diagram or map for a structure from other resources (devices) 120.

The term "structure" may, for example, apply to all or part of one or more natural or man-made physical arrangements of object(s), the knowledge of which may be of use to a user of mobile device 106. For example, a structure may comprise one or more buildings or a portion thereof. A "feature" may, for example, identify an object or obstacle (e.g., a wall, a door, an elevator, a staircase, a statue, etc.), an entity or service (e.g., a business, a taxi stand, a restroom, a doctor's office, a lost and found department, a security station, etc.), or any other navigational, location-based service characteristic which may be identified via representative data in one or more files of an electronic map. In certain instances, for example, a feature may represent something to navigate around (e.g., a route obstacle), navigate towards or through (e.g., a doorway, an elevator, etc.), or possibly navigate away from (e.g., a staircase). Of course these are simply a few examples of features, as with all of the examples presented herein, and claimed subject matter is not necessarily intended to be so limited.

Figure 2:
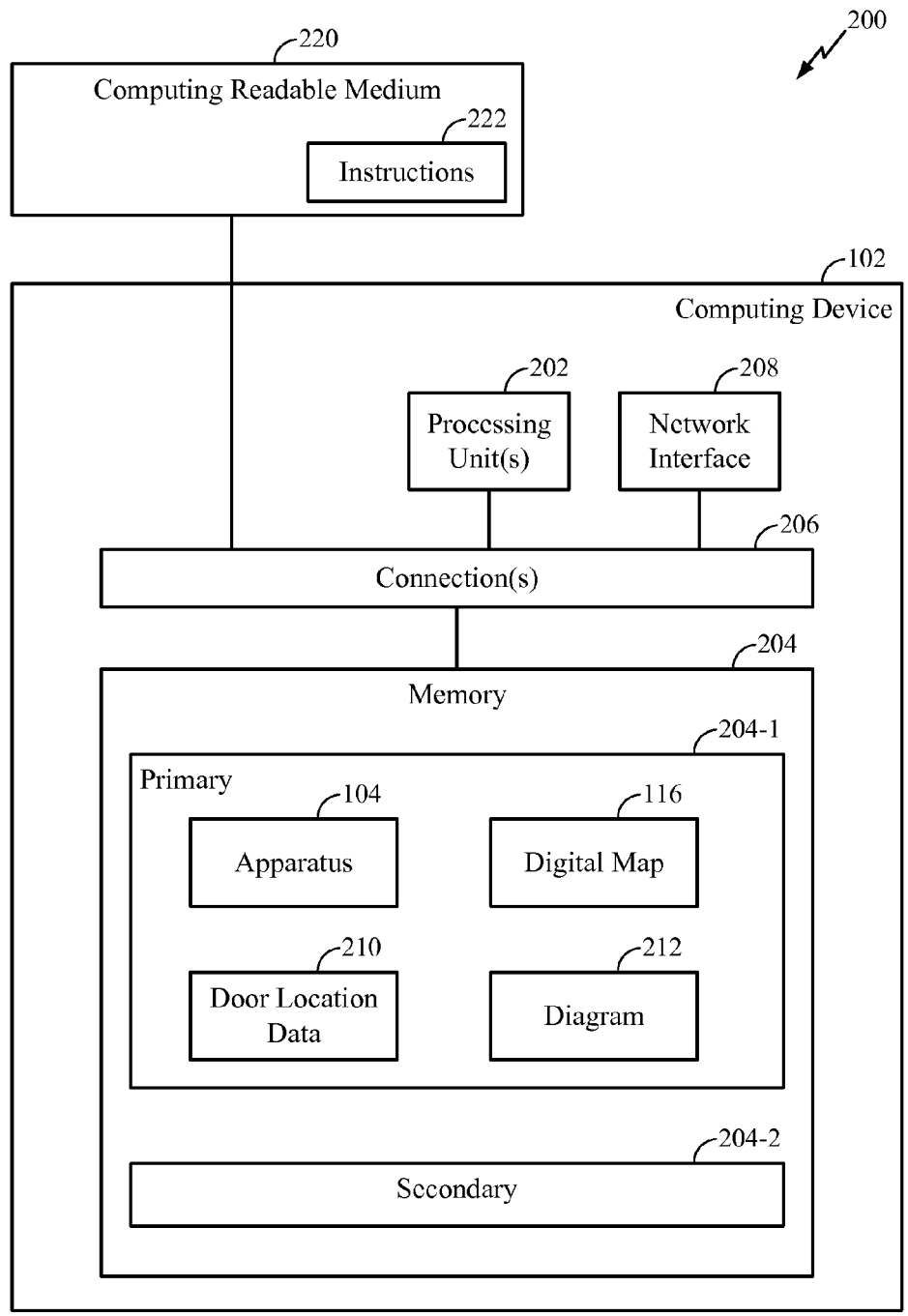
FIG. 2 is a schematic block diagram illustrating certain features of a computing device that may generate, transmit, store or otherwise process a routing map in accordance with an example implementation.

FIG. 2 is a schematic block diagram illustrating certain features of computing device 102, for example as in FIG. 1, in accordance with an implementation. As illustrated computing device 102 comprises one or more processing units 202 to perform data processing (e.g., in accordance with the techniques provided herein) coupled to a memory 204 via one or more connections 206. Processing unit(s) 202 may, for example, be implemented in hardware or a combination of hardware and software. Processing unit(s) 202 may, for example, be representative of one or more circuits configurable to perform at least a portion of a computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism and may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within computing device 102. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, a (non-transitory) computer readable medium 220. Memory 204 and/or computer readable medium 220 may comprise computer-implementable instructions 222 for certain example techniques as provided herein.

As illustrated in FIG. 2, at various times memory 204 may store certain signals representing data and/or computer-implementable instructions for certain example techniques as provided herein. For example, memory 204 may store data and/or computer-implementable instructions for apparatus 104. By way of example, memory 204 may at various times store representative data for door locations 210, one or more diagrams 212 or portions thereof, all or part of a digital map 116.

As shown, computing device 102 may, for example, include a network interface 208. Network interface 208 may, for example, provide a capability to receive and/or transmit wired and/or wireless signals, e.g., to communicate via network(s) 110 (FIG. 1).

In certain example implementations, computing device 102 may take the form of a server or other device. In alternative implementations, computing device 102 may take the form of a wireless network element, or other location-based service element, or alternatively may take the form of a portion of a cloud computing configuration, or alternatively still may take the form of a wireless access point or other like local area computing resource.

Figure 3:
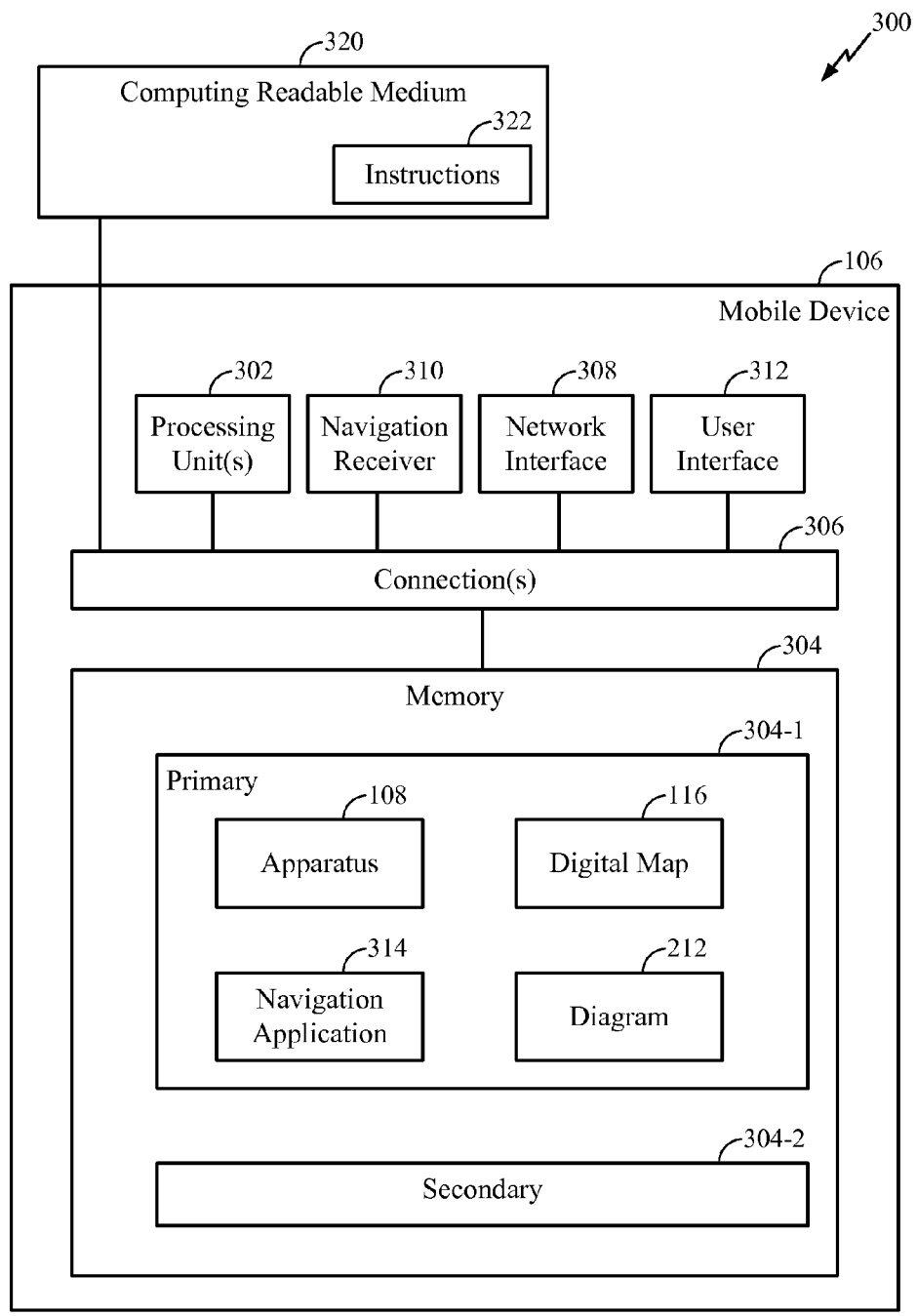
FIG. 3 is a schematic block diagram illustrating certain features of a mobile device that may use, generate, transmit, store or otherwise process a routing map, in accordance with an example implementation.

FIG. 3 is a schematic block diagram illustrating certain features of mobile device 106, for example as in FIG. 1, in accordance with an implementation. Mobile device 106 comprises one or more processing units 302 to perform processing (e.g., in accordance with the techniques provided herein) coupled to a memory 304 via one or more connections 306. Processing unit(s) 302 may, for example, be implemented in hardware or a combination of hardware and software. Processing unit(s) 302 may, for example, be representative of one or more circuits configurable to perform at least a portion of a computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 304 may be representative of any data storage mechanism and may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within mobile device 106. Secondary memory 304-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, a (non-transitory) computer readable medium 320. Memory 304 and/or computer readable medium 320 may comprise computer-implementable instructions 322 for certain example techniques as provided herein.

As illustrated in FIG. 3, at various times memory 304 may store certain signals representing data and/or computer-implementable instructions for certain example techniques as provided herein. For example, memory 304 may store data and/or computer-implementable instructions for apparatus 108. By way of example, memory 304 may at various times store representative data for a digital map 116, one or more diagrams 212 or portions thereof, and possibly a navigation application 314. In certain instances, memory 304 may also comprise similar instructions and/or data as shown in the example computing device 102 of FIG. 2. For example, in certain implementations, mobile device 106 may perform all or part of the functions that may be associated with apparatus 104 in computing device 102.

As shown, mobile device 106 includes a network interface 308 which may, for example, provide a capability to receive and/or transmit wired and/or wireless signals, e.g., to communicate via network(s) 110 (FIG. 1). Mobile device 106 may further comprise a navigation receiver 310, which can provide position location or other navigation services based on wireless signals transmitted by various transmitting devices. For example, navigation receiver 310 may comprise an SPS receiver capable of receiving and processing one or more Global Navigation Satellite Systems (GNSSs), or other satellite or terrestrial locating services, such as, e.g., one or more location based services (LBSs) which may be provided, at least in part, by a cellular network, a WiFi network, etc.

Mobile device 106 may further comprise one or more user interfaces 312 for one or more user input and/or user output devices. Thus, for example, user interface 312 may comprise a keypad, a touch screen, various buttons, various indicators, a display screen, a speaker, a microphone, a projector, a camera, etc.

Mobile device 106 is representative of any electronic device that may be moved about within environment 100. For example, mobile device 106 may comprise a hand-held computing and/or communication device, such as, a mobile telephone, smart phone, lap top computer, tablet computer, navigation device, and/or the like. In certain implementations, mobile device 106 may be part of a circuit board, an electronic chip, etc. It should be understood that mobile device 106 may also or alternatively comprise one or more other circuits, mechanisms, etc., (not shown) that may be of use in performing one or more other functions or capabilities, and/or supportive of certain example techniques as provided herein.

Computing device 102 and/or mobile device 106 may, for example, be enabled (e.g., via one or more network interfaces) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATS) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, 1S-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

An electronic diagram such as a digital map of an indoor space maybe derived, for example, from a CAD or other similar drawing or file. Thus, a diagram may show rooms and hallways formed or defined by walls, doorways, etc. Once the diagram is transformed to another particular format usable as a digital map (if necessary), the digital map may be electronically stored for access by mobile devices as discussed elsewhere herein.

Figure 4:
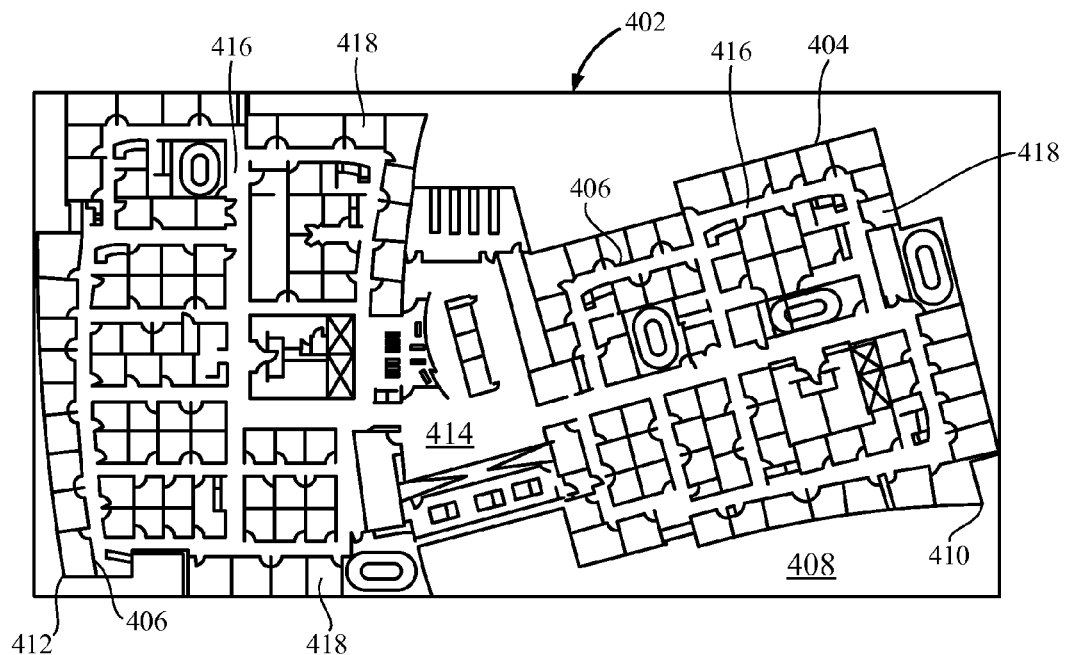
FIG. 4 is a representation of a digital map for use in generating a routing map in accordance with an example implementation.

By way of a simple example, FIG. 4 illustrates a representation of a map 402 including a structure 404 having a plurality of features 406 (e.g., walls, doors, etc.) and an exterior region 408 surrounding structure 404. Structure 404 further includes a right wing 410 and a left wing 412 which are connected to each other by a central open area 414. Right and left wings 410, 412 each include a plurality of hallways 416 leading to a plurality of rooms 418. In the illustrated embodiment map 402 is comprised of a black and white, binary image in bitmap format. However other embodiments may include images in other types of bitmap formats. Image formats for maps may be acquired by the conversion of files in CAD or other vector-based formats into bitmap formats. Also image formats may be acquired from a website, a camera, or a mobile device including a camera taking a picture of a displayed map, scanning a printed map, copying an image presented on the internet and so forth, just to name a few examples.

Map 402 may include pixels designated by at least two coordinates, for example an x and y coordinate along a X axis and a Y axis. The pixels can correspond to position points. Structural components of the binary map image that forms map 402 are represented by black pixels and open spaces are represented by while pixels. Structural components, for example, can include interior and exterior walls, doors, doorways, stairwells, elevator shafts, and windows. Open spaces, for example, can include rooms, hallways, stairs, elevator car space, courtyards, and exterior features such as gardens or walkways. Open spaces can be bounded on one or more sides by structural components. (In alternative embodiments, however, this can be reversed whereby structural components can be represented by white pixels and open spaces by black pixels.)

According to an embodiment it is desirable to identify (or otherwise remove) from map 402 the pixel data that corresponds to exterior region 408. This is premised upon an assumption that a routing map that is to be created will to be limited to routes or paths within structure 404 and will not include paths in exterior region 408. This removal or identification of certain pixel data can eliminate what might otherwise become noise when certain morphological operations are later performed as described elsewhere herein. Accordingly a duplicate (not shown) of map 402 is made and certain morphological operations are applied to the duplicate. Specifically a morphological closing process may be applied to the duplicate binary image that forms the duplicate map (not shown) and can include a morphological dilation operation followed by a morphological erosion operation to determine an output value for pixels in the image.

In an example of a morphological closing operation, black pixels can be associated with a logic value of "0" and white pixels can be associated with a logic value of "1". A particular pixel in a duplicate map can be a target pixel, or pixel of interest for an iteration of the morphological closing operation. A neighborhood for each target pixel in the duplicate map can be defined as pixels bordering the target pixel. The number and arrangement of pixels in a neighborhood may vary based on the complexity of shapes on the binary map image. As an example, for a substantially rectangular shape, target pixel may have a neighborhood of eight pixels, i.e., top, bottom, left, right, diagonal top right, diagonal top left, diagonal bottom right, and diagonal bottom left. For target pixels at an edge of an image, parts of the neighborhood can extend past the border of the image to encompass undefined pixels. A logic value of "1" or "0" may be assigned to the undefined pixels for a dilation operation or an erosion operation as described in more detail below.

A dilation operation can operate, in turn, on pixels in a duplicate map, such that as the morphological dilation operation steps through pixels in the image, each pixel, in turn, can be the target pixel. A dilation operation may generate an output value of the target pixel can be a maximum value of pixels in the neighborhood of the target pixel. For example, if any of the pixels in the neighborhood of the target pixel has a logic value of "1" (i.e., a white pixel), an output value of the target pixel can be logic value of "1" (i.e., a white pixel). For border pixels, in the morphological dilation operation, undefined pixels beyond the border of the image can be assigned to a logic value of "0". In response to this morphological dilation operation white areas may expand and thereby fill imaging discontinuities in physically continuous structural components to remove these discontinuities.

Following the dilation operation and in a manner similar to the operation described herein, an erosion operation can be applied individually to multiple pixels, in turn, of the duplicate map to complete the morphological closing operation. An erosion operation can remove feature distortions produced during the expansion of the white areas during a dilation operation. In response to an erosion operation, an output value of a target pixel can be the minimum value of pixels in the neighborhood of the target pixel. For example, if any pixels in the neighborhood of the target pixel has a logic value of "0" (i.e., a black pixel), an output value of the target pixel can be a logic value of "0" (i.e., a black pixel). For border pixels, in the erosion operation, undefined pixels beyond the border of the image can be assigned to a logic value of "1".

Figure 5:
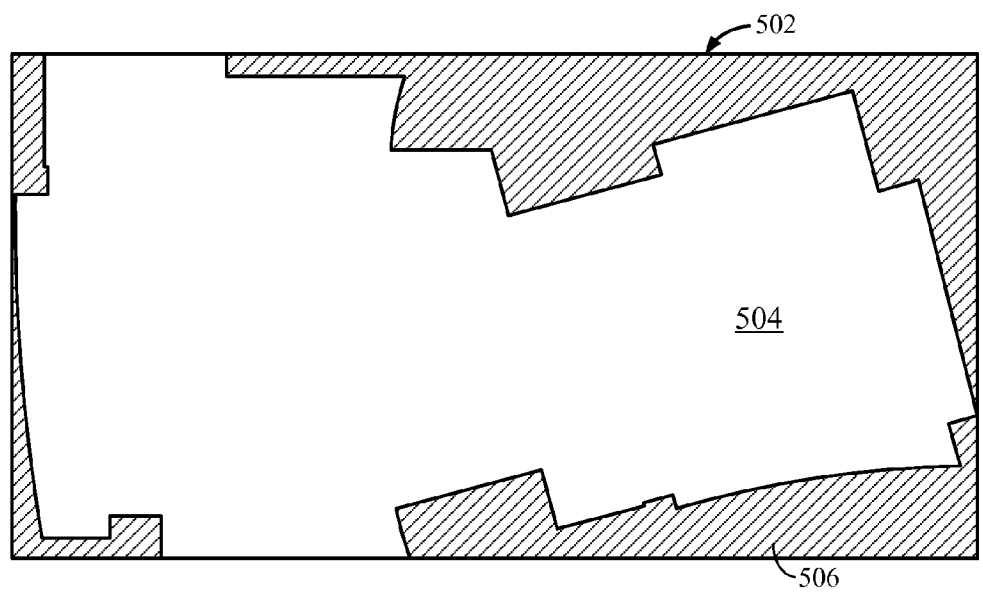
FIG. 5 is a representation of another map that can be generated based upon certain processing of the map of FIG. 4 in accordance with an example implementation.

A morphological hole-filling operation may be performed on a duplicate map that can be produced by the above described morphological dilation operation. A morphological hole-filling operation can convert to white pixels clusters of black pixels that are completely surrounded, or bounded, by connected, or adjoining, white pixels (i.e., pixels adjoined along a pixel edge, for example, top, bottom, left, or right edges). Surrounded clusters of black pixels can be defined as holes. FIG. 5 illustrates a duplicate map 502 in binary bitmap format which may be generated from the above-described morphological operations, including hole-filling operation. In response to these operations, binary image pixels of map 502 within the defined boundary of structure 404 (FIG. 4) can correspond to a logic value of "1" or a white pixel.

Still referring to FIG. 5, pixel positions can be classified as interior position points or exterior position points. White pixels, which can correspond to a digital logic value of "1" as discussed above, can be classified as interior pixel position points 504. Black pixels, which can correspond to a digital logic value of "0" as discussed above, can be classified as exterior pixel position points 506. Exterior position points 506 correspond to exterior region 408 of FIG. 4. Thus black pixels of FIG. 5 may be deleted from the file comprising the image, or alternatively the identity of these pixels as noted by their position in the image can be saved for future reference and used in a follow-up processing of the image. As explained in more detail elsewhere herein, this deletion or identification in effect can remove unwanted data from the image file which potentially can become noise that might detract from the result of further morphological operations.

Figure 6:
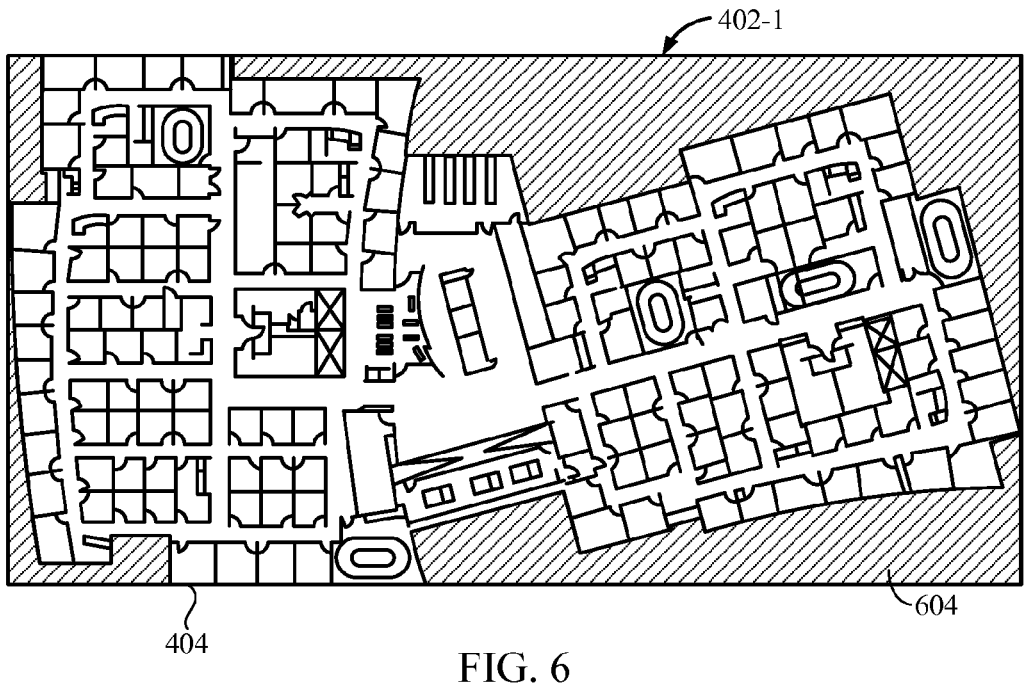
FIG. 6 is a representation of another map that can be generated based upon certain processing of the map of FIG. 4 in accordance with an example implementation.

Having identified the pixels in duplicate map 502 that are associated with exterior region 408, original map 402 (FIG. 4) can be processed. Pixels corresponding to exterior position points 506 of duplicate map 502 can be used to identify locations of corresponding pixels in original map 402. The process then can change these identified pixels in original map 402 having a digital logic value of "1" (white pixels) to a digital logic value of "0" (black pixels). FIG. 6 illustrates an output of this processing of map 402 of FIG. 4 whereby exterior position pixels have been assigned this logic value of "0". FIG. 6 shows a map 402-1 which includes structure 404 of FIG. 4 and an exterior region 604 comprised wholly of black pixels. In an alternative embodiment exterior region 604 may not exist at all, in that all pixels previously associated with that region may be deleted from the data file that comprises map 402-1.

Figure 7:
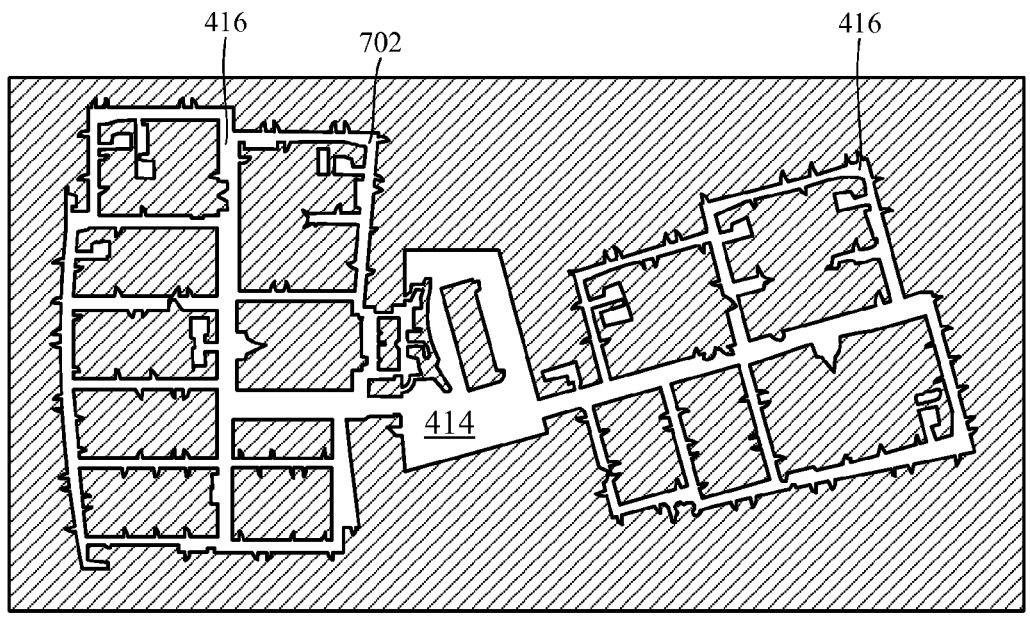
FIG. 7 is a representation of a connected component that can be generated based upon certain processing of the map of FIG. 6 in accordance with an example implementation.

Map 402-1 of FIG. 6 can be processed further by selecting in the image one or more connected components (e.g., maximal regions of a set of pixels having the same or similar values and which are not separated by a boundary) where connected components correspond to the open spaces in the structure interior and have a dimension that is larger than a predetermined size. Referring to FIG. 7, there is shown an output of such a processing of FIG. 6 according to an embodiment. A single connected component 702 is selected. Criteria of the foregoing process may be to select regions of white pixels (since they correspond to open, potentially navigable, spaces) which are not separated by boundaries (e.g., doors or walls) which such regions are larger than a predetermined size. In the illustrated embodiment a predetermined size is a dimension of a connected component that is greater than about twenty-five percent of either an overall width of structure 404 or an overall length of structure 404 (FIG. 6). However alternative embodiments may use predetermined sizes of other amounts. Also it should be noted that because the pixels associated with exterior region 604 were converted to black pixels for noise removal as described elsewhere herein, no portions of exterior region 604 were identified as a connected component.

In an embodiment a bounding box (or enclosing box) can be used as a minimum polygonal area (such as, for example, a rectangular area) within which all points or pixels of the connected component may lie. Thus the width and/or height dimension of the minimum bounding box (not shown) can be used to compare against the width and length of structure 404 (FIG. 6) for determining whether a threshold predetermined size limit has been met. As can be seen from FIG. 6, for example, the interiors of many rooms may preliminarily be viewed as connected components. However they would not be identified as qualifying connected components, because their dimensions may not exceed a predetermined portion of the width or length of structure 404 such as, for example, may not exceed twenty-five percent of the width or length. Accordingly the interiors of the rooms do not appear in FIG. 7 as a selected connected component.

Connected component 702 of FIG. 7 comprises central open area 414 and the plurality of hallways 416. It should be further noted that in the case of FIGS. 6 and 7, only one connected component meeting the predetermined size limitation has been selected. This connected component includes hallways 416 in the right and left wings 410, 412 of the structure and central open area 414 which connects right and left wings 410, 412. This is a single connected component, because in the case of FIGS. 6 and 7 there is no barrier, such as a wall or a closed door for example, that separates the illustrated hallways and/or the central open area. For example there is no barrier separating left and right wings 410, 412 of structure 404 from one another or from central open area 414. It can further be appreciated however that an alternative map may have barriers separating structure features such as, for example, one or more barriers separating structure wings from each other or from a central open area. In such an instance, a plurality of qualifying connected components may be selected, and further image processing may proceed for these connected components as described elsewhere herein.

Having selected a connected component of a predetermined size, such as connected component 702 of FIG. 7, a morphological process can be performed on connected component 702 in order to create one or more routing paths. The morphological process can include, for example, a thinning process, a shrinking process or a skeletonization process, among others. A skeletonization process may generally involve repeatedly deleting the contour points or pixels of an image provided the following conditions are satisfied: (a) end points are not deleted, (b) connectivity is not broken, and (c) excessive erosion of the region does not occur. A shrinking process may generally involve the reducing of objects in a binary image to a single point located at the geometric center of the object. This may be thought of as finding the center of mass of an object. For objects that do not have holes in them, a single point may be generated. If there is a hole, the process may produce a ring of pixels that surrounds the hole and is equidistant from the nearest boundary. A thinning process may be somewhat similar to shrinking, except that thinning may generate a minimally-connected line that is equidistant from the boundaries and that some of the structure of the object is maintained.

Although having some differences in the final result, one common feature of any of these three processes may be in effect that of stripping away the pixels from the outer boundary of the component image. This stripping away of the pixels may be on a layer-by-layer basis, starting outwardly and working inwardly, until there remains a dot or a line disposed generally in the center of the interior of a region that initially was occupied by the original connected component. In some embodiments this line may have a width of a single pixel, or the dot may be comprised of a single pixel.

Figure 8:
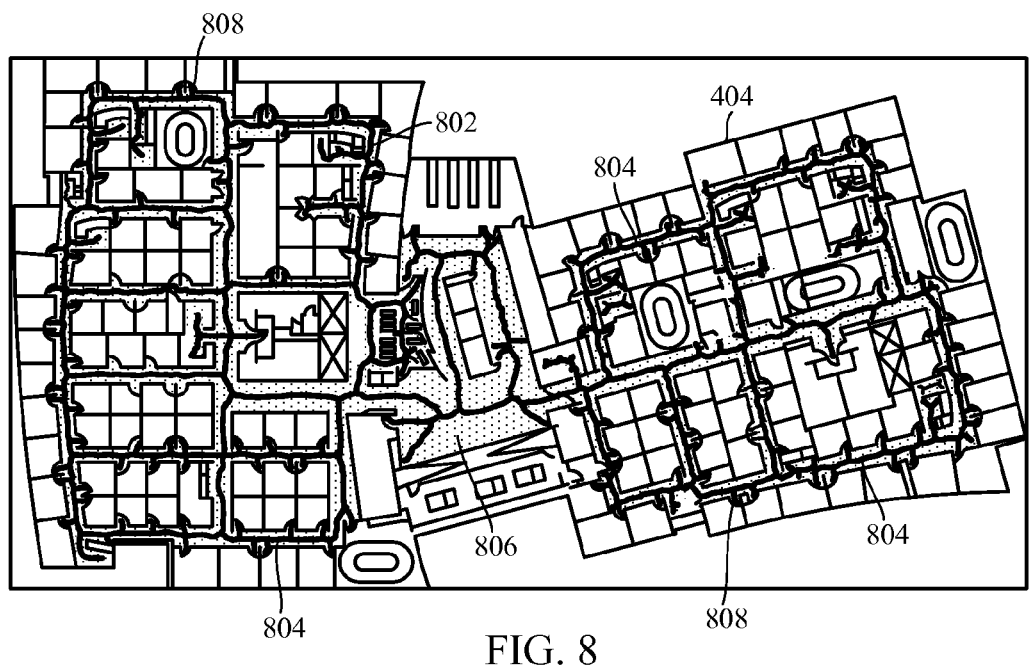
FIG. 8 is a representation of a map including a path that can be generated based upon certain processing of a connected component in accordance with an example implementation.

FIG. 8 illustrates the result of a morphological thinning process performed on connected component 702 of FIG. 7 superimposing on an image of structure 404 of FIG. 6 according to an embodiment. The thinning process may generate a path 802 as shown for example by relatively heavy, but narrow, lines in FIG. 8. Path 802 is comprised of a plurality of path segments 804, and has an overall linear length corresponding to a sum total of the lengths of the various path segments 804 that make up path 802. A shaded region 806 surrounds path 802 and represents connected component 702 of FIG. 7 as it would appear prior to the thinning process. In some embodiments shaded region 806 need not actually appear on a map provided to a user; however shaded region 806 is illustrated in FIG. 8 to show a relationship between connected component 702 (FIG. 7) and a resulting path 802. Responsive to a thinning process, points in at least a majority of the linear length of path 802 may be constrained so that they are disposed substantially equidistant (as observed by a user viewing the map) between the structural features, e.g., walls, that define the open or navigable area in which path 802 is disposed. Moreover certain segments 804 of path 802 are comprised of relatively short segments or spurs 808 that lead to and terminate at other structural features, e.g., closed doors.

Figure 9:
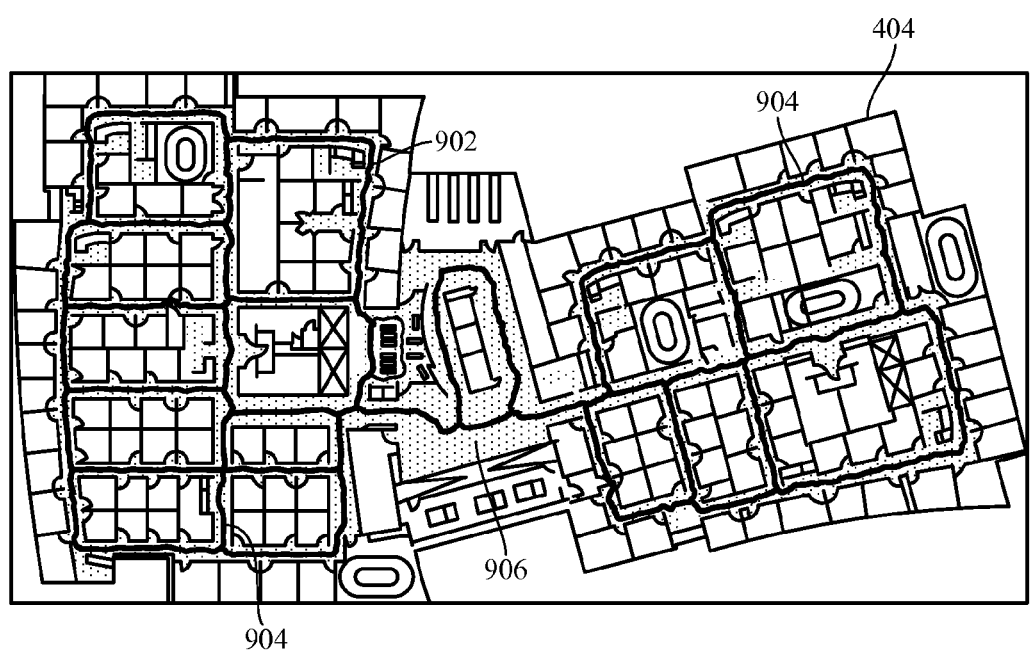
FIG. 9 is a representation of another map including another path that can be generated based upon certain processing of a connected component in accordance with an example implementation.

FIG. 9 illustrates an output of a morphological shrinking process performed on connected component 702 of FIG. 7 superimposing on an image of structure 404 of FIG. 6 according to an embodiment. The shrinking process may generate a path 902 as shown by relatively heavy, but narrow, lines in FIG. 9. Path 902 is comprised of a plurality of path segments 904, and has an overall linear length corresponding to a sum total of the lengths of the various path segments 904 that make up path 902. A shaded region 906 surrounds path 902 and represents connected component 702 of FIG. 7 as it would appear prior to the shrinking process. In some embodiments shaded region 906 need not actually appear on a map provided to a user; however shaded region 906 is illustrated in FIG. 9 to show the relationship between connected component 702 (FIG. 7) and path 902. Responsive to a shrinking process points in at least a majority of the linear length of path 902 may be constrained so that they are disposed substantially equidistant (as observed by a user viewing the map) between certain structural features, e.g. walls, that define the open or navigable area in which path 902 is disposed. However in contrast to path 802 of FIG. 8, path 902 of FIG. 9 is comprised of loops without spurs, such as spurs 808 of FIG. 8. In some applications this may be more desirable as it may be inferred that such loops would represent main paths, e.g., paths used by relatively heavy pedestrian traffic.

In alternative embodiments, door location information may be provided to create path segments between hallways and the entrances to rooms, and in some embodiments into the interiors of the rooms as well. These maps may be derived from preliminary maps that otherwise may not show such path segments. According to an embodiment, one or more paths are created for a map using morphological operations as described in more detail elsewhere herein to create a preliminary map. One example of such a preliminary map may comprise a map that includes path 902 shown in FIG. 9. Another file or data source may be received which has location parameters corresponding to those locations on the preliminary map of one or more doors or other structural features that afford a user an option to enter or physically access a region that may be separated by the structural feature. This location data may be used to identify on a preliminary map locations of these doors or other structural features. A preexisting path segment that is disposed closest to the location of a door may be identified. Also identified is a location or point on this identified preexisting path segment that is closest to the door. Finally a new path segment is created which extends between the location of the door and the identified point on the preexisting identified path segment. Thus for example this new path segment may correspond to a segment leading from a primary hallway to the entrance of a room that is accessible from the hallway.

In an alternative embodiment, an electronic digital map may be created to include path segments leading from hallways to an entrance to rooms as well as into the rooms themselves, even if the source map depicts closed doors or other obstacles between the hallways and the rooms. According to an embodiment a source map and a supplemental file may be received. The supplemental file has location parameters corresponding to the location(s) on the source map of one or more doors or other structural features that afford a user an option to enter or physically access a region that may be separated by the structural feature. Then the values of a predetermined number of pixels on the source map that are proximate to the location of the doors may be changed so that the values are the same as that of the pixels associated with the hallways and the room interiors. In other words if for example the hallways and room interiors are represented on a map by white pixels (having a value of "1") and the closed doors or other structural features are represented by black pixels (having a value of "0"), then the values of the predetermined number of black pixels located at and adjacent to the location of the door would be changed to a value of "1" (white). This may have an effect of "erasing" a closed door or other structural feature and providing an unobstructed path from a hallway to an interior of a room, for example.

Each such room or other area may thereby become "connected" to a hallway (or other relatively large accessible region) and this could likely become a part of a qualifying connected component for further morphological operations as described elsewhere herein for creating path segments leading up to and into the room. On the other hand if the structural feature (e.g., the closed door) had not been "erased," then the room (or similar region) may remain enclosed and not connected to a hallway or other larger region. Such a room then may not be identified or selected as a qualified connected component due to not meeting the minimum predetermined size limitation. Accordingly this room otherwise may not be processed with subsequent morphological operations, and path segments leading up to and into such a room may not be created.

FIGS. 10-12 illustrate stages in the creation of a digital map as generally described above according to an embodiment. FIG. 10 shows a source map 1002 of a shopping mall structure 1012 which includes a plurality of large stores 1004 and small stores 1006 connected by a plurality of hallways 1008. Also shown are a plurality of doors 1010 which are illustrated by heavier lines or dots superimposed on certain structural features of structure 1012. The locations of doors 1010 were received from another file or data source and have been positioned on the source map at their corresponding location for illustration purposes.

FIG. 11 shows a modified source map 1002-1 that was derived from source map 1002 of FIG. 10. In modified source map 1002-1 a portion of the structural features at and near doors 1010 of FIG. 10 have been "erased," i.e., the values of a predetermined number of pixels on the map that are disposed at and proximate to the location of the doors are changed so that the values are the same as that of the pixels associated with the hallways and the room interiors. As can be seen, large and small stores 1004, 1006 and other relatively small regions that were previously isolated from the hallways are no longer isolated. At the locations of doors 1010 of FIG. 10 there now are openings 1102 leading into the stores as seen in FIG. 11.

FIG. 12 shows a final route map 1202 generated from modified source map 1002-1 (FIG. 11) after one or more qualifying connected components (not shown) were selected in modified source map 1002-1, a skeletonization morphological operation was performed on the qualifying connected component(s), and then the result superimposed on modified source map 1002-1 of FIG. 11. As can be seen from FIG. 12 a path 1203 is created having a plurality of path segments 1204. Some path segments 1204 lead through common hallways. However other path segments 1204 lead up to the entrance of rooms (or stores) and into them as well. Large portions of path segments 1204 are disposed at or near the centers of the interiors of large and small stores 1004, 1006 as opposed to being disposed closer to their walls.

Final route map 1202 of FIG. 12 provides a path that may be useful for applications where it is desirable to provide path segments that are disposed inside rooms or stores or similar such regions. On the other hand there may be other applications where this level of detail is not desirable and where only hallway paths and segments leading up to but not inside rooms, stores, etc. may be desired. Referring to FIG. 13 it can be seen that such an embodiment can be generated from final route map 1202 of FIG. 12. Taking final route map 1202, the stores are identified and the routing segments disposed within each store are removed as shown in FIG. 13 thus providing a modified final route map 1202-1. Modified final route map 1202-1 includes a modified path 1203-1 having modified path segments 1204-1 associated with the hallways and with portions of the accessible areas leading up to the entrance of each store or room.

Figure 14:
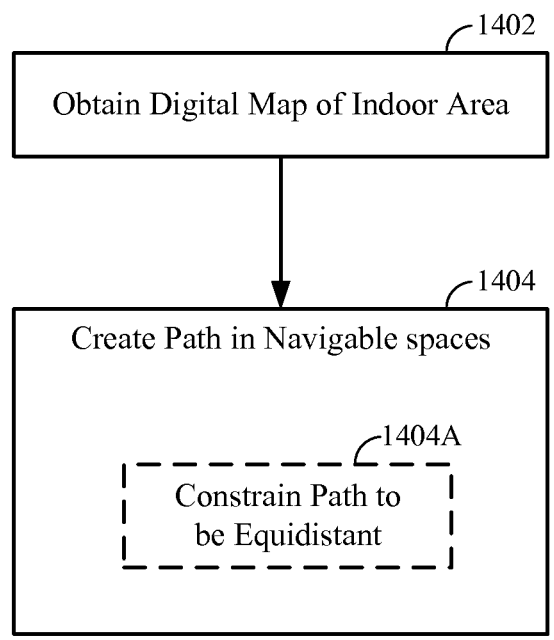
FIG. 14 is a simplified flow diagram of a method of generating a digital map having a path according to an implementation.

FIG. 14 is a simplified flow diagram of a method of generating a digital map having a path according to an implementation. This method may correspond to the processes of FIGS. 1-13 described in detail elsewhere herein. Claimed subject matter is not limited in scope to the particular order or arrangement of the stages shown. Likewise, additional stages may be included in an embodiment or stages depicting one or more operations in place of those shown may be used in an embodiment. In a particular implementation an electronic digital map including a plurality of navigable spaces in an indoor area bounded by structural features is obtained. (Block 1402) Using a processor a path disposed in the navigable spaces within the indoor area is created. (Block 1404) The creating of the path includes constraining points in at least a majority of the linear length of the path to be disposed substantially equidistant between structural features bounding the navigable spaces. (Block 1404A)

Figure 15:
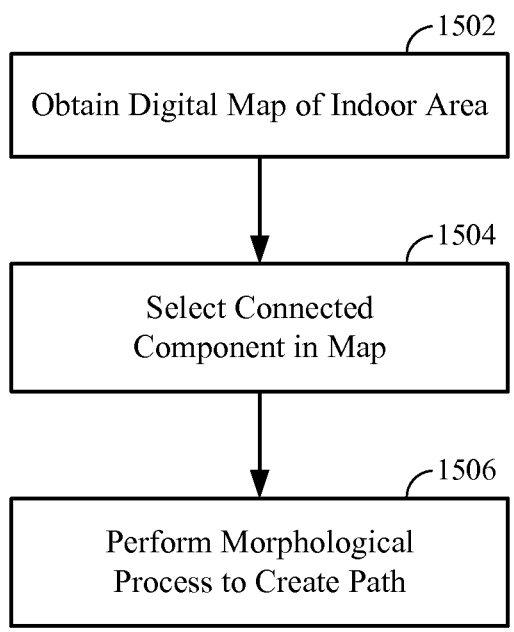
FIG. 15 is a simplified flow diagram of a method of generating a digital map having a path according to an alternative implementation.

FIG. 15 is a simplified flow diagram of a method of generating a digital map having a route or path according to an alternative implementation. This method may correspond to the processes of FIGS. 1-13 described in detail elsewhere herein. Claimed subject matter is not limited in scope to the particular order or arrangement of the stages shown. Likewise, additional stages may be included in an embodiment or stages depicting one or more operations in place of those shown may be used in an embodiment. In a particular implementation an electronic digital map may be obtained. (Block 1502) The map may comprise a bitmap format and define a plurality of navigable spaces in an indoor area bounded by structural features. Using a processor, a connected component in the map is selected. (Block 1504) The connected component corresponds to at least a portion of the plurality of the navigable spaces. A morphological process is performed on the connected component thereby generating a path. (Block 1506) The morphological process may comprise a thinning process, a shrinking process or a skeletonization process, among other processes. The path is disposed in the navigable spaces and includes a plurality of path segments that have been constrained to be disposed substantially equidistant between structural features bounding the navigable spaces in which the path segments are located.

Reference throughout this specification to "one example", "an example", "certain examples", or "example implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information (e.g., as representative data). It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "creating," "computing," "calculating," "converting," "determining", "performing", "selecting", "receiving", "changing", "establishing", "obtaining", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

In view of the above, it will be appreciated that certain embodiments overcome many of the long-standing problems in the art by providing a method, apparatus and product for the automatic generation of a map with routing paths that can be derived from one or more relatively large, open or navigable spaces in a binary image of a map. The open spaces may be automatically selected based on relatively large groups of pixels having the same value such as, for example, all having the value of "1" (white pixels) or alternatively all having the value of "0" (black pixels). Morphological operations are performed on these large groups of pixels to derive one or more paths. Moreover the width of the paths may be inferred based upon the number of operations required to generate the paths from the large group of pixels.

Using morphological operations on digital binary maps as described herein can have the advantage of producing paths in a shorter amount of time as compared with alternative methods of creating paths. Morphological operations may be available with hardware-accelerated application programming interfaces (API's) such as, for example, the open source computer vision (OpenCV) library and the FastCV computer vision library, among others. Moreover route maps can be created based upon a wider range of maps, such as raster-based and vector-based maps among others. Additionally embodiments of the claimed subject matter may enable mobile devices to have the ability to create paths for maps without the need for computing assistance from a server.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A computer-implemented method of processing a digital map in a vector format, the method comprising:
    obtaining the digital map, wherein the digital map includes a plurality of navigable spaces in an indoor area, wherein the plurality of navigable spaces is bounded by a plurality of structural features;
    creating, using a processor, a path having a linear length and disposed in at least a portion of the plurality of the navigable spaces, and wherein the creating of the path includes constraining points in at least a majority of the linear length to be disposed substantially equidistant between at least a portion of the plurality of the structural features; and
    converting the digital map to a bitmap format having a first plurality of pixels of a first value and a second plurality of pixels of a second value, wherein the first plurality of pixels corresponds to a representation of the plurality of the structural features, and wherein the second plurality of pixels corresponds to a representation of the plurality of the navigable spaces.

2. A computer-implemented method of processing a digital map comprising:
    obtaining the digital map, wherein the digital map includes a plurality of navigable spaces in an indoor area, wherein the plurality of navigable spaces is bounded by a plurality of structural features;
    creating, using a processor, a path having a linear length and disposed in at least a portion of the plurality of the navigable spaces, and wherein the creating of the path includes constraining points in at least a majority of the linear length to be disposed substantially equidistant between at least a portion of the plurality of the structural features; and
    selecting a connected component,
        wherein the digital map is in a bitmap format,
        wherein the connected component corresponds to at least a portion of the plurality of the navigable spaces,
        wherein the path is based, at least in part, on the connected component, and
        wherein the creating of the path further comprises performing a morphological process on the connected component.

3. The method of claim 2 wherein the morphological process includes one of a thinning process, a shrinking process and a skeletonization process.

4. The method of claim 2 wherein the digital map further includes a representation of an outdoor area, the method further comprising identifying pixel data corresponding to the outdoor area of the digital map,
    wherein the identifying of the pixel data corresponding to the outdoor area includes performing a morphological process.

5. The method of claim 2 wherein the selecting of the connected component includes determining whether a region of pixels has a dimension greater than a predetermined size, wherein the region of pixels is comprised of a set of pixels having the same value and not separated by a boundary.

6. The method of claim 5 wherein the predetermined size of the dimension of the connected component is a dimension that is greater than about twenty-five percent of one of a width of the indoor area and a length of the indoor area.

7. The method of claim 2 wherein the digital map further includes a first plurality of pixels having a first value and a second plurality of pixels having a second value, wherein the first plurality of pixels corresponds to a representation of the plurality of the structural features, and wherein the second plurality of pixels corresponds to a representation of the plurality of the navigable spaces, the method further comprising:
    receiving a file having location data corresponding to a location on the digital map of a door;
    identifying, using the location data, a position on the digital map corresponding to the location of the door; and
    changing the values of a predetermined number of pixels of the digital map from the first value to the second value, wherein the predetermined number of pixels is disposed at and proximate to the position on the digital map corresponding to the location of the door.

8. The method of claim 2, further comprising:
    receiving a file having location data corresponding to a location on the digital map of a door;
    identifying, using the location data, a position on the digital map corresponding to the location of the door;
    identifying a closest portion of the path that is disposed closest to the position on the digital map of the door; and
    creating a new portion of the path extending between the position on the digital map of the door and a location point, wherein the location point is disposed on the identified closest portion of the path at a location that is approximately closest to the position on the digital map of the door.

9. A device comprising one or more processors to:
    obtain a digital map including a plurality of navigable spaces in an indoor area, wherein the plurality of navigable spaces is bounded by a plurality of structural features; and
    create a path by selecting a connected component and by performing a morphological process on the connected component, wherein the path has a linear length and is disposed in at least a portion of the plurality of the navigable spaces, and wherein the creating of the path includes constraining points in at least a majority of the linear length to be disposed substantially equidistant between at least a portion of the plurality of the structural features,
    wherein the digital map is in a bitmap format,
    wherein the connected component corresponds to at least a portion of the plurality of the navigable spaces, and
    wherein the path is based, at least in part, on the connected component.

10. The device of claim 9 wherein the morphological process includes one of a thinning process, a shrinking process and a skeletonization process.

11. The device of claim 9 wherein the digital map further includes a representation of an outdoor area, and wherein the one or more processors are further to identify pixel data corresponding to the outdoor area of the digital map,
    wherein the identifying of the pixel data corresponding to the outdoor area includes performing a morphological process.

12. The device of claim 9 wherein the one or more processors are further to select the connected component by determining whether a region of pixels has a dimension greater than a predetermined size, wherein the region of pixels is comprised of a set of pixels having the same value and not separated by a boundary.

13. A non-transitory, computer-readable, storage medium comprising machine-readable instructions stored thereon which are executable by a special purpose computing apparatus to:

obtain a digital map including a plurality of navigable spaces in an indoor area, wherein the plurality of navigable spaces is bounded by a plurality of structural features; and create a path by selecting a connected component and by performing a morphological process on the connected component, wherein the path has a linear length and is disposed in at least a portion of the plurality of the navigable spaces, and wherein the creating of the path includes constraining points in at least a majority of the linear length to be disposed substantially equidistant between at least a portion of the plurality of the structural features, wherein the digital map is in a bitmap format, wherein the connected component corresponds to at least a portion of the plurality of the navigable spaces, and wherein the path is based, at least in part, on the connected component.

14. The storage medium of claim 13 wherein the morphological process includes one of a thinning process, a shrinking process and a skeletonization process.

* * * * *